United States Patent
Irwin, Jr. et al.

(10) Patent No.: US 10,529,187 B2
(45) Date of Patent: Jan. 7, 2020

(54) ELECTRONIC INSTANT TICKETS FOR INSTANT TICKET VENDING MACHINES

(71) Applicant: Tapcentive, Inc., San Francisco, CA (US)

(72) Inventors: Kenneth E. Irwin, Jr., Dawsonville, GA (US); David Wentker, San Francisco, CA (US)

(73) Assignee: Tapcentive, Inc., San Francisco, CA (US)

( * ) Notice: Subject to any disclaimer, the term of this patent is extended or adjusted under 35 U.S.C. 154(b) by 206 days.

(21) Appl. No.: 15/837,617

(22) Filed: Dec. 11, 2017

(65) Prior Publication Data

US 2018/0165915 A1    Jun. 14, 2018

Related U.S. Application Data (60) Provisional application No. 62/431,861, filed on Dec. 9, 2016.

(51) Int. Cl.
*A63F 13/00*    (2014.01)
*G07F 17/32*    (2006.01)
(Continued)

(52) U.S. Cl.
CPC ...... *G07F 17/3251* (2013.01); *G07F 17/3211* (2013.01); *G07F 17/3225* (2013.01);
(Continued)

(58) Field of Classification Search
CPC ............. G07F 17/3251; G07F 17/3241; G07F 17/3225
See application file for complete search history.

(56) References Cited

U.S. PATENT DOCUMENTS

| 5,348,299 A | 9/1994 | Clapper, Jr. |
| 5,941,771 A | 8/1999 | Haste, III |

(Continued)

OTHER PUBLICATIONS

"Instant Ticket Vending Machine EDS-Q—Reference Guide for ITVM Retailers." GTECH's Interlott ITVM, Virginia Lottery, downloaded from web page: https://www.valottery.com/~/media/Images/Retailer/ITVM_EDS-Q_%20Manual.ashx; download date: Dec. 2, 2017, original posting date: unknown, 35 pages.

*Primary Examiner* — James S. McClellan
*Assistant Examiner* — Kevin M Carter
(74) *Attorney, Agent, or Firm* — Panitch Schwarze Belisario & Nadel LLP (57) ABSTRACT

Systems and methods are provided to electronically dispense a plurality of Electronic Instant Tickets (EITs) from a gaming microprocessor that is electronically programmed by a game service provider with a set of predetermined EITs. An Instant Ticket Vending Machine (ITVM) communicates with the gaming microprocessor to receive the EITs and display the results dictated by the EITs. The EITs allow the ITVM to operate independently of network communications with the game service provider and without providing predetermined outcomes embodied in a paper medium. Paper embodiments of the EITs associated with the gaming session and which are displayed on the display during the gaming session are printed. The dispensed printed paper embodiments of the EITs did not exist prior to the gaming session and are only printed upon game play of an EIT.

22 Claims, 6 Drawing Sheets

(51) Int. Cl.
   *G06K 19/06*     (2006.01)
   *G07F 17/42*     (2006.01)
   *G07F 11/68*     (2006.01)
   *G07F 7/02*      (2006.01)

(52) U.S. Cl.
   CPC ... *G07F 17/3241* (2013.01); *G06K 19/06028* (2013.01); *G07F 7/025* (2013.01); *G07F 11/68* (2013.01); *G07F 17/42* (2013.01)

(56) References Cited

U.S. PATENT DOCUMENTS

| | | | |
|---|---|---|---|
| 7,695,360 B2 | 4/2010 | Breslo | |
| 2003/0042306 A1* | 3/2003 | Irwin, Jr. | A63F 3/0665 235/441 |
| 2004/0166919 A1* | 8/2004 | Duhamel | G07F 17/32 463/17 |
| 2004/0235550 A1* | 11/2004 | McNally | G07F 17/329 463/16 |
| 2006/0279038 A1* | 12/2006 | Irwin, Jr. | A63F 3/0665 273/138.1 |
| 2008/0081686 A1* | 4/2008 | Irwin, Jr. | G07F 17/32 463/17 |
| 2008/0084024 A1* | 4/2008 | Streeter | A63F 3/0645 273/139 |
| 2011/0105213 A1* | 5/2011 | Irwin, Jr. | G07F 17/32 463/17 |
| 2015/0018080 A1 | 1/2015 | Shenker et al. | |
| 2017/0024962 A1 | 1/2017 | Shenker et al. | |

* cited by examiner

ELECTRONIC INSTANT TICKETS FOR INSTANT TICKET VENDING MACHINES

CROSS-REFERENCE TO RELATED APPLICATIONS

This application claims priority to U.S. Provisional Patent Application No. 62/431,861 filed Dec. 9, 2016, which is incorporated herein by reference.

BACKGROUND OF THE INVENTION

Field of the Invention

The present invention is the innovation of control mechanisms for enabling Instant Ticket Vending Machines (IT-VMs) to operate legally without the need for any physical preprinted paper tickets or barcodes. Specifically, this innovation resolves the numerous logistical, maintenance, reliability, and security problems as well as expenses associated with printing, transporting, and loading ITVMs with preprinted paper tickets or barcoded rolls of paper.

Background

Both "Class III" slot machines and "Class II" ITVMs enable games of chance to be played with enhanced entertainment and appeal resulting in billions of dollars in revenue worldwide. While slot machines typically rely on some form of Random Number Generator (RNG) electronically generating real-time results, ITVMs rely on instant ticket's or pull-tab's prize awards dispensed at the time of play, both types of machines generate profit by essentially allocating a portion of play revenue for prizes with the remainder allocated to expenses and yield.

In the special case of ITVMs, these instant ticket's or pull-tab's prize awards are predetermined with the order of the instant tickets or pull-tabs dispensed determining both when and what prize is awarded on a given play. Thus, with a predetermined prize structure, Class II ITVMs will ultimately payout exactly what the loaded "shuffle", "deal", or "pool" of instant tickets or pull-tabs were determined to payout at the time of printing at the factory. In contrast, Class III slot machines rely on the law of large numbers to achieve expected payouts and consequently can deviate from expected values over the short term—e.g., it is theoretically possible that a Class III slot machine could payout two jackpots sequentially. However, as a practical matter, with a sufficient number of plays or "pulls", Class III slot machines typically payout to within three standard deviations of their expected value.

Class II ITVMs came into being as a matter of legal necessity. Class II machines are usually employed by state lotteries, tribal gaming reservations, charitable gaming, and "racinos"—racinos are gambling establishments that allow Class II machines at a live horse track. Often, these institutions are prohibited or severely restricted by law from operating (Vegas style) Class III slot machines. Thus, Class II ITVMs were created to accommodate gaming licenses for these types of institutions.

Most consumers would have a difficult time differentiating between a Class II and a Class III machine with some Class II machines automatically trashing the "instant ticket" (e.g., barcodes preprinted on paper roll stock) so that the tiny slips of paper do not create a cleanup problem for the operating establishment. However, Class II machines typically require higher maintenance and operating costs due to the handling of the physical paper tickets (e.g., paper ticket disposal, paper ticket dispensing, paper ticket security, lower reliability due to moving parts, costs associated with preprinting and transporting paper tickets) when compared to Class III slots. Additionally, there are security concerns with Class II machines that are not typically associated with Class III slots—e.g., if an installer of instant ticket or pull-tab shuffle, deal, or pool can determine the sequence of winning tickets he or she could potentially illicitly profit by only playing the machine when the winning plays were due, thereby leaving only losing plays available to the general public.

Thus, there is a need to modernize or possible eliminate the need for preprinted ticket or pull-tab stock for determining the outcome of ITVMs while still maintaining compliance with existing laws for Class II machines.

SUMMARY OF THE INVENTION

Objects and advantages of the invention will be set forth in part in the following description, or may be obvious from the description, or may be learned through practice of the invention.

Described are mechanisms, systems, and methodologies related to Electronic Instant Tickets (EITs) embodied in secure, portable, digital memory enabling hitherto unknown efficiencies, levels of security, and flexibility in Class II ITVMs. These EIT mechanisms, systems, and methodologies implemented in a manner that ensures compatibility with existing Class II ITVM laws and regulations.

In a particular embodiment, Electronic Instant Tickets (EITs) are embodied in a secure gambling microprocessor chip embedded in a plastic card with Direct Contact (DC) or Radio Frequency (RF) contactless communications such that the EITs can be mounted in ITVMs thereby replacing paper embodied instant ticket or pull-tabs currently utilized. Alternatively, embedded EITs may be sold directly to the consumer, with the consumer linking the EITs to an ITVM or another device. The secure chip holds multiplicities of EITs for individual game play by ITVMs. The secure gambling microprocessor chip is also referred to herein as a "gaming microprocessor chip," or "a gaming microprocessor."

In other embodiments, secure gambling microprocessor chip EITs are embedded in: a MicroSD, Subscriber Identity Module (SIM), or a Printed Circuit Board (PCB) with a Universal Serial Bus (USB) interface. As before, these embodiments enable ITVMs to utilize the digital EITs instead of prior art paper instant tickets or pull-tabs.

In another embodiment, an embedded Random Number Generator (RNG) determines the dispensing sequence of the EITs stored in the secure gambling microprocessor.

Described are a number of mechanisms and methodologies that provide practical details for reliably producing EITs as alternative sources for existing ITVM gaming systems that consequently offer a more reliable, secure, and dynamic gaming platform complying with existing gaming laws with a more economic implementation.

The secure gambling microprocessor makes it possible to issue electronic instant tickets in a secure contained and portable medium that can be readily installed in ITVMs by untrained personnel.

DETAILED DESCRIPTION OF THE INVENTION

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Certain terminology is used herein for convenience only and is not to be taken as a limitation on the present invention. The words "a" and "an", as used in the claims and in the corresponding portions of the specification, mean "at least one." The terms "instant ticket" and "pull-tab" are used interchangeably with no appreciable difference in their various electronic embodiments. Both refer to games where the plays are drawn from a stack of predetermined outcomes that were determined by a previous "shuffle", "deal", or "pool." Thus, an "Instant Ticket Vending Machine (ITVM)" could also be interpreted as a form of pull-tab vending machine. The words "shuffle", "deal", or "pool" all mean a fixed set of electronic instant tickets. Finally, the terms "Electronic Instant Tickets" or "EITs" are used interchangeably to mean either individual electronic tickets that are embodied in a secure gambling microprocessor chip embedded in a plastic card or the embedded secure gambling plastic card itself.

Figure 1:
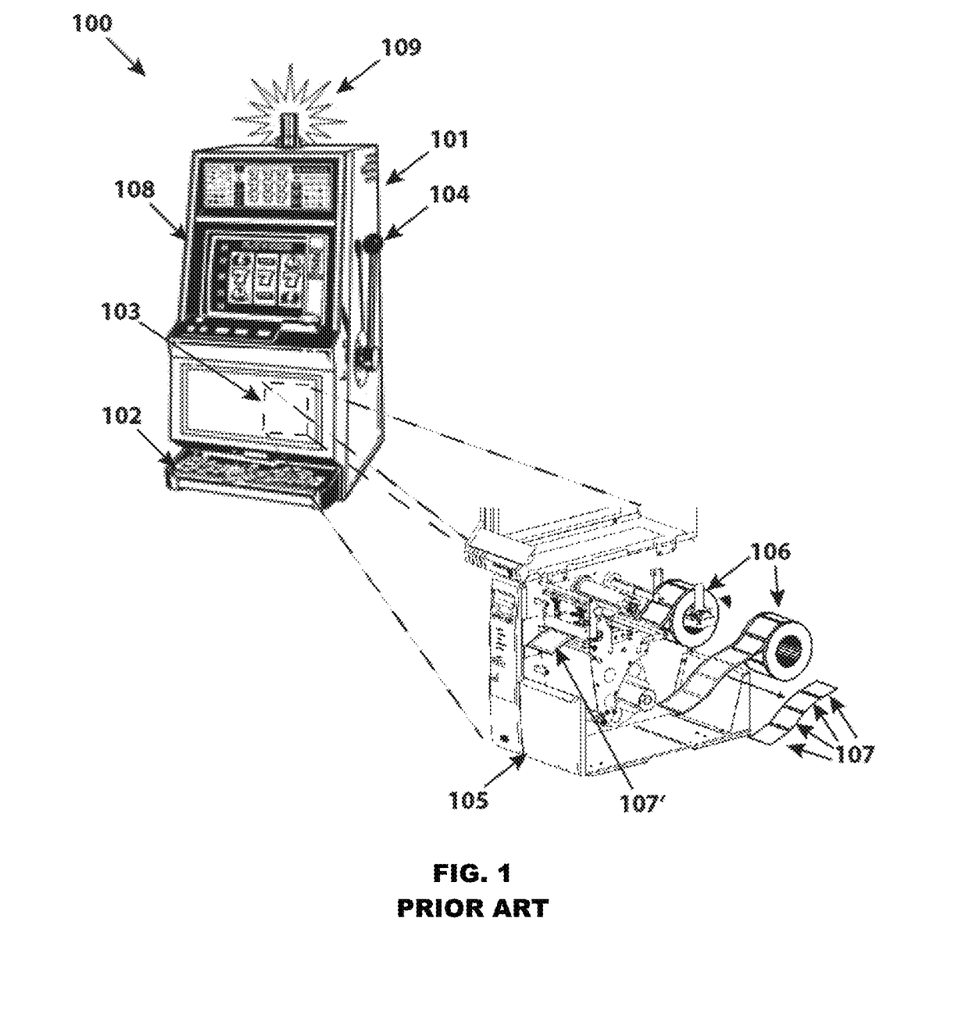
FIG. 1 is an exemplary isometric view of a prior art ITVM utilizing a paper roll of instant tickets to determine play outcome.

FIG. 1 depicts an isometric drawing 100 of a typical, prior art, ITVM 101 with its internal instant ticket dispenser and reader 105 highlighted as a blowup detail. As illustrated in the drawing 100, the ITVM 101 typically resembles a slot type machine; however, rather than have each play's outcome determined by a Random Number Generator (RNG) the outcome is determined by a preprinted set of instant tickets or pull-tabs that are sequentially dispensed in a tray 102 to the consumer with each new play. As illustrated in the example of drawing 100, a new play is initiated whenever the consumer pulls the ITVM's handle 104. Thus, with the prior art ITVMs 101, multiplicities of instant tickets or pull-tabs accumulate in a tray 102 within easy access for the consumer. However, as a practical matter, the consumer rarely removes the dispensed instant tickets or pull-tabs from the tray 102 since the play's win or lose result is displayed in an amusing fashion on the ITVM's display 108 and possibly beacon 109 with any winnings maintained in the ITVM's totalizer memory thereby allowing the consumer to cash out with one receipt that is automatically printed Often, as both security and paper savings measures, the dispensed instant tickets or pull-tabs simply embody printed encrypted barcode indicia with no corresponding human decipherable win or lose information, thereby making it less likely that a consumer would even bother to collect the dispensed instant tickets or pull-tabs. In some prior art embodiments, the dispensed instant tickets or pull-tabs are even deposited directly into an internal trash can and not made available to the consumer in an attempt to lessen clean up problems at the retail establishment hosting the ITVMs.

The internal instant ticket or pull-tab dispenser 105 is illustrated in a blow-up isometric illustration that is normally hidden from the consumer by the ITVM cabinet 203 as shown in drawing 100. As shown in the drawing 100, the instant tickets or pull-tabs are typically stored as a spool of paper 106 with multiplicities of instant tickets or pull-tabs 107 printed on the paper spool 106. Thus, with each subsequent play initiated by the consumer, the dispenser 105 unravels the spool 106 one instant ticket or pull-tab's length 107, scans the associated barcode (not shown in FIG. 1) passing the scanned data to a ITVM Central Processing Unit ("CPU"—not shown in FIG. 1) for decryption and correspondingly play result display, and finally cutting the paper spool with the corresponding instant ticket or pull-tab 107' dispensed to the tray 102 or internal trash can.

From the previous description, it can readily be seen that the existing prior art ITVMs rely on the paper spool 106 of instant tickets or pull-tabs 107 as both the memory of the intended payout as well as the legal mechanism to enable Class II gaming. Obviously, this process has numerous disadvantages including: the added costs of preprinting rolls 106 of instant ticket or pull-tabs, the logistical challenges of transporting multiplicities of rolls 106 to the various retail locations, installing the rolls 106 in the ITVMs 101, the mechanical complexity and therefore inherent unreliability of advancing paper spools 106 one instant ticket or pull-tab 107 at a time, the lower security in having prizes embodied in a printed product with no scratch-off coating, etc.

Figure 2:
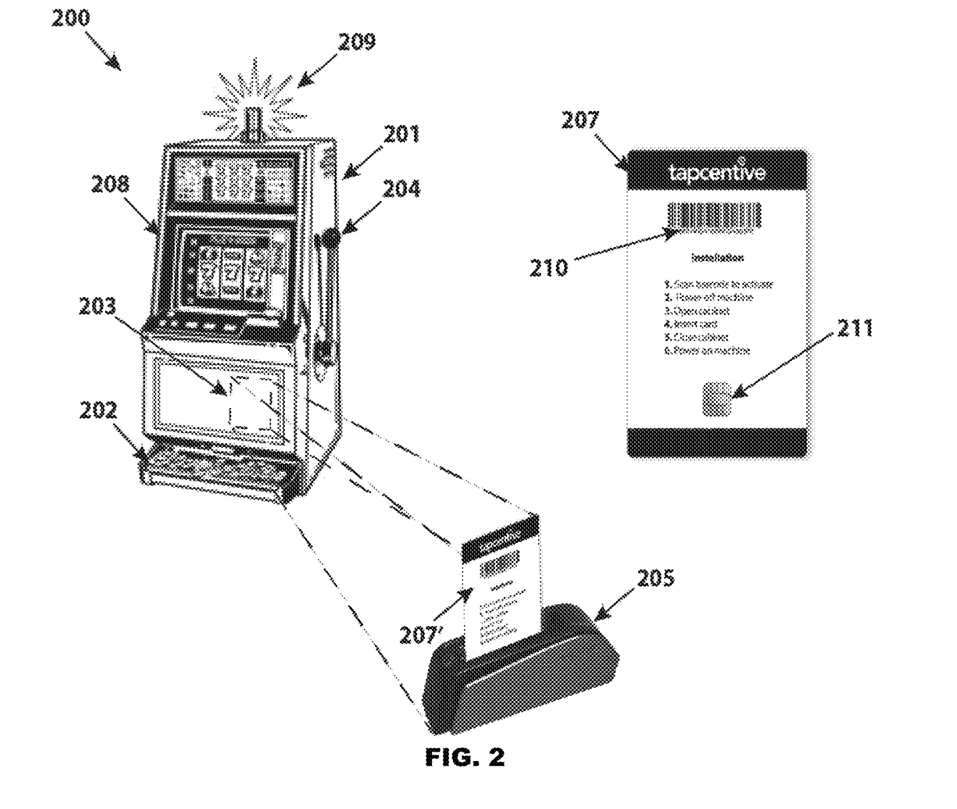
FIG. 2 is a representative example of the isometric view of the ITVM of FIG. 1 adapted to accept play outcome from an EIT interface secure gambling microprocessor chip embedded in a card with direct contacts.

Fortunately, these inherent disadvantages are overcome with the invention 200 depicted in FIG. 2. As illustrated in FIG. 2, the invention embodied in ITVM 201 would appear to the consumer to be identical to the, prior art, ITVM 101 (FIG. 1) with the possible exception of no instant tickets or pull-tabs being dispensed into the tray 202 (FIG. 2). As before, the ITVM 201 invention would feature an actuation handle or button 204 to trigger play as well as a display 208 and possible beacon 209 to signal winning play status. The principle difference being the reinvented ITVM 201 would substitute the roll of instant tickets or pull-tabs 106 dispenser 105 (FIG. 1) of the prior art with a card reader 205 and associated Electronic Instant Ticket (EIT) card (207 and 207')—see blowup illustration 203 of FIG. 2. Thus, in this embodiment 200 of the invention, the entire paper roll 106 (FIG. 1) of instant tickets or pull-tabs 107 unspooled, scanned, cut, and released by the mechanical dispenser 105 is replaced by a no-moving-parts card reader 205 (FIG. 2) and an EIT embodied in a plastic card (207 and 207'). As is apparent to one skilled in the art, this substitution of a card reader 205 and associated EIT card (207 and 207') will inherently reduce costs by eliminating the need to print rolls of instant ticket or pull-tabs and reduce logistical challenges of transporting multiplicities of rolls to the various retail locations as well as installing the rolls in the ITVMs. Additionally, the mechanical complexity and therefore inherent unreliability of advancing paper spools one instant ticket or pull-tab at a time is eliminated, which inherently increases reliability while at the same time enhancing security. Finally, the EIT cards themselves can be, after use, recycled with new instant ticket data loaded into their memory thereby eliminating all waste.

The EIT card 207 itself houses a secure gambling microprocessor for carrying out cryptographic operations. A microprocessor is embedded in a package with multiple physical security measures, which gives it a degree of tamper resistance. Although a number of secure microprocessors may be utilized, in a preferred embodiment the SmartMX® chip designed by NXP® is one example of a microprocessor having suitable capabilities. In general, the secure gambling microprocessor is implemented on a high-security, tamper resistant, chip. Specialized cryptographic electronics, microprocessor, memory, etc. housed within a tamper responding secure gambling microprocessor provide a highly secure subsystem in which data processing and cryptography can be performed.

In one embodiment, the secure microprocessor may include a Direct Current ("DC") contact interface 211 embedded in the surface of the card 207 compliant with international specification ISO/IEC 7816. In an alternative embodiment, a contactless interface (i.e., Radio Frequency—"RF") according to international specification ISO/IEC 14443 may be employed with the DC contact interface 211 eliminated. Obviously, the card reader 205 would need to support whatever interface (e.g., DC, RF) is required to be compatible with the EIT card 207.

Regardless of the EIT card 207 type, it is preferable that the EIT card 207 also include an inventory control serial number 210 to allow tracking of the card through the shipping and installation process as well as possibly aiding in unlocking and activating the card at the time of installation. As illustrated in FIG. 2, this inventory control serial number 210 can be preferably embodied as a machine-readable barcode in addition to human readable digits thereby automating the tracking and (optional) activation process. Of course, the inventory control serial number can be digitally embodied in the microprocessor chip itself accessible via the DC contact interface 211 or other (e.g., RF) interface.

Suitable off-the-shelf card readers 205 (e.g., ZCS model ZCS180) typically are equipped with a Universal Serial Bus (USB) interface similar to the interface supplied to the extant instant ticket or pull-tab dispenser 105 (FIG. 1) thereby greatly expediting upgrading prior art ITVMs 101 to ITVMs 201 (FIG. 2) compatible with the invention. Additionally, since the off-the-shelf card readers 205 usually incorporate no moving parts, power and cooling requirements are also greatly reduced with the majority of suitable card readers 205 being powered directly by the internal USB port.

The EIT card is backwardly compatible with existing instant ticket or pull-tab laws and regulations since the instant tickets or pull-tabs are physically embodied in a secure gambling microprocessor chip memory in a card, albeit in an electronic format. This physical embodiment of a deal or shuffle of electronic instant tickets in the card's secure gambling microprocessor chip memory ensures that the card is compatible with existing regulation and laws—i.e., existing laws require that the instant tickets be transported and dispensed in a secure manner, but there is typically no reference to the instant tickets having to be embodied as ink printed on a paper document. However, in jurisdictions where it is required that a physical ticket be dispensed, the physical instant ticket can be printed real time or as a summary document at cash out by the ITVM's 201 internal printer (not shown in FIG. 2) after the play outcome and ticket information has been read from the EIT card thereby still eliminating the need for dispensing of pre-printed stock and the associated logistic problems.

Of course, as is apparent to one skilled in the art, there are other embodiments of secure gambling microprocessors (e.g., MicroSD, Subscriber Identity Module—"SIM", Printed Circuit Board—"PCB"—with a USB interface) that may under some circumstances be preferred for some installations. For example, a PCB with an USB interface could theoretically replace the need for card reader 205 by plugging directly into the ITVM USB port, thereby further reducing complexity and costs. However, other memory devices such as disk drives, USB memory chips, Compact Disks (CDs), etc. are less desirable since they are inherently less secure and typically less reliable. Even when these types of devices have an additional security layer of encrypting their data into ciphertext built-on, the overall package remains less secure since the logistics of secure decryption key management are considerably more complex than with secure gambling microprocessors.

Figure 3:
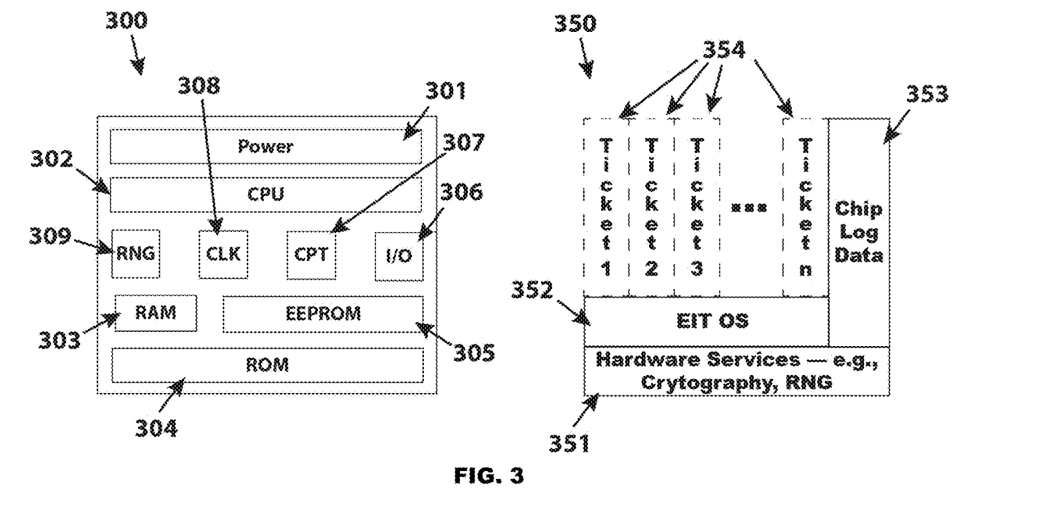
FIG. 3 is a block diagram of two representative examples of the internal functionality of the secure gambling microprocessor chip embodying the EIT equipped ITVM of FIG. 2.

FIG. 3 illustrates two block diagrams 300 and 350 showing the internal functionality of the secure gambling microprocessor chip supporting the EITs disclosed in the previous embodiments. Block diagrams 300 and 350, taken together, illustrate one embodiment of the secure gambling microprocessor chip with block diagram 300 showing the hardware and firmware off-the-shelf functionality of the chip and block diagram 350 demonstrating how the chip is customized via firmware, software, and electronic data to support EITs compatible with this invention.

As previously stated, in general the secure gambling microprocessor 300 is a dedicated computer on a chip designed to carry out cryptographic operations, embedded in a packaging with multiple physical security measures, which give it a degree of tamper resistance. Although a number of secure microprocessors may be used herewith. In a preferred embodiment, SmartMX designed by NXP can be customized as the secure gambling microprocessor 300 having data cryptographic capabilities available off-the-shelf.

The Payment Card Industry Digital Security Standards (PCI/DSS) for plastic credit or debit card with embedded microprocessors typically mandate this same family of chips. By utilizing chips developed to the PCI/DSS for secure gambling microprocessor applications, the inherent security of the hardware chip and its interfaces can be reasonably assumed to have been extensively tested and hardened against attacks with the secure gambling microprocessor platform being built-up with a sound foundation. Furthermore, by the very nature of the widely distributed PCI/DSS base chips in credit and debit cards securing hundreds of billions if not trillions of dollars for everyday transactions, it can be readily assumed that if a security flaw in the basic secure gambling microprocessor chip architecture is detected it will first become apparent with PCI applications instead of secure gambling applications.

Returning to FIG. 3, a block diagram of an off-the-shelf embodiment of a secure gambling microprocessor 300 is shown. One embodiment of secure gambling microprocessor 300 includes Power 301, a Central Processing Unit (CPU) 302, a Random Number Generator (RNG) 309, a connection for an external Clock 308, a Cryptographic Coprocessor (CPT) 307, Input and Output (I/O) ports 306, Random Access Memory (RAM) 303, Electrically Erasable Programmable Read Only Memory (EEPROM) 305, and Read Only Memory (ROM) 304. The software for gaming operations can be stored and run from ROM 304 or EEPROM 108 and would rely on the support of the CPT 307 and possibly the RNG 309 for many of the operations.

In general, CPT 307 is implemented on a high-security, tamper resistant, chip. Specialized cryptographic electronics, microprocessor, memory, and random number generator housed within a tamper-responding secure gambling microprocessor 300 provide a highly secure subsystem in which data processing and cryptography can be performed. In one embodiment, CPT 307 includes a high-speed 3-DES (Triple Data Encryption Standard) coprocessor (64-bit parallel), a high-speed AES (Advanced Encryption Standard) coprocessor (128-bit parallel), and a PKI (Public Key Infrastructure—e.g., RSA, ECC) coprocessor FameXE (32-bit parallel) such as found on a SmartMX by NXP. However, it should be appreciated that although the SmartMX is disclosed herein, the invention is well suited to using other comparable platforms.

In general, CPU 302 is hardware within a computer chip that carries out the instructions of a computer program by performing the basic arithmetical, logical, and I/O operations of the system. Two components of CPU 302 are the arithmetic logic unit for performing arithmetic and logical operations, and the control unit for extracting instructions from memory and decoding and executing them, calling on the arithmetic logic unit when necessary. CPU 302 may be multiprocessor, multi-core processors, and the like.

In various embodiments, the communication protocol to the microprocessor may be an ISO-7816 DC contact, or an ISO-14443 RF contactless, or both. Although a number of components are shown, it should be appreciated that secure gambling microprocessor 300 may include more or fewer components. Moreover, in an embodiment, the components described in secure gambling microprocessor 300 may be substituted for other components that provide similar operational capabilities. That is, there are many other options for implementations of the secure gambling microprocessor 300 that could involve other types of processors (micro or otherwise), modules, computing platforms or the like.

This off-the-shelf secure gambling microprocessor chip platform of 300 can be customized via firmware, software, and electronic data to support EITs as illustrated in diagram 350. The general-purpose CPT 307, secure I/O 306, and (optionally) RNG 309 can be reappropriated to provide fundamental hardware services 351 to the EIT enabled secure gambling microprocessor chip. The chip's ROM 304 would be typically allocated to store the EIT enabled Operating System (OS) 352 providing the specific calls unique to supporting EITs in ITVMs—e.g., locking and unlocking stored EITs, dispensing EITs over an authenticated channel to the ITVM CPU, possibly randomly selecting which individual EIT is to be dispensed, digitally signing dispensed EITs, etc. Finally, chip RAM 303 would typically be used for computational space with the EEPROM storing the EITs 354 as well as any non-volatile log data 353.

Figure 4:
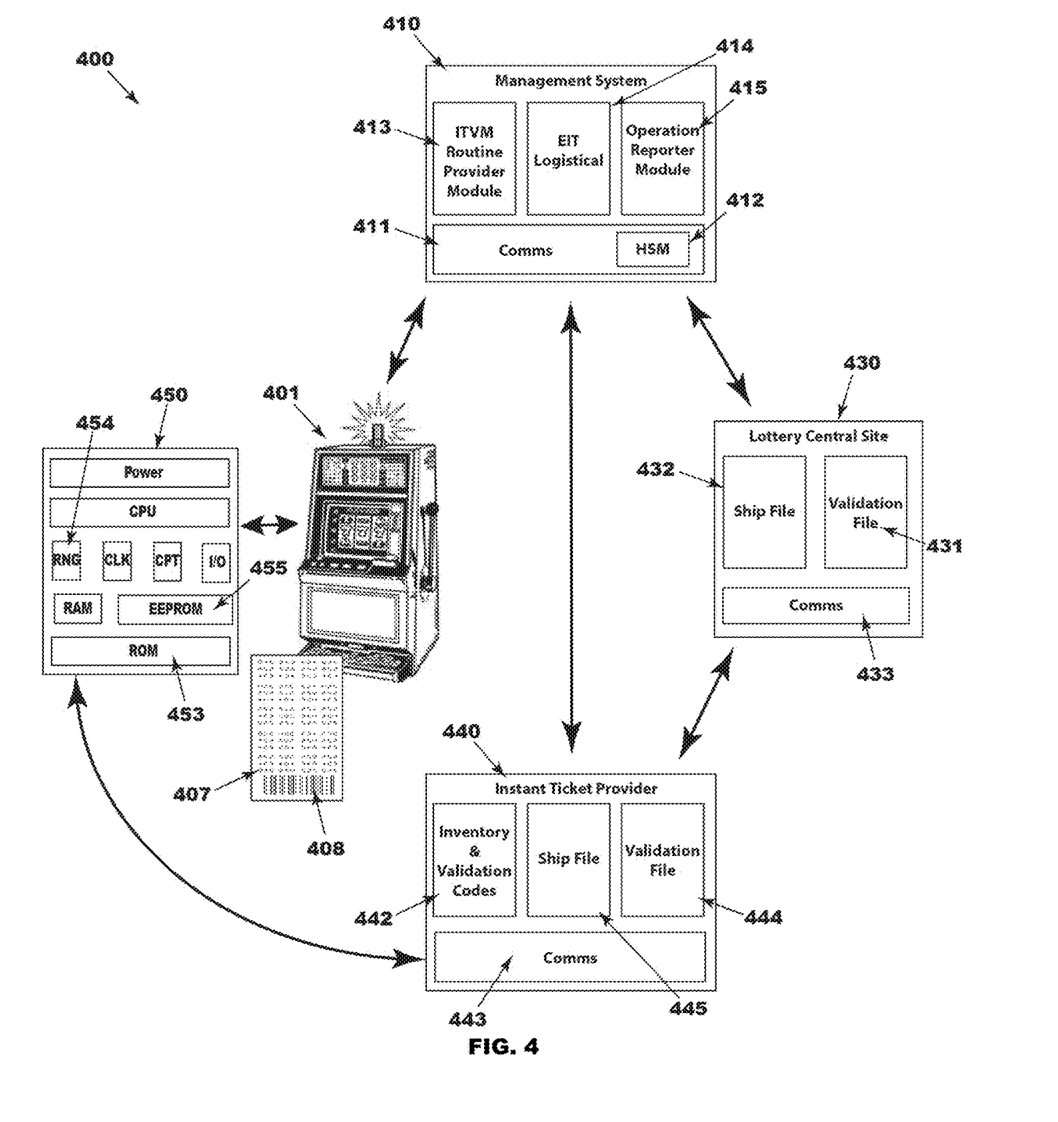
FIG. 4 is a block diagram providing a schematic graphical overview of a general embodiment as applied to the EIT equipped ITVM of FIG. 2 into an overall system in accordance with an embodiment.

With reference now to FIG. 4, an embodiment of an ITVM overall system 400 is shown as part of a network accessible system that includes: the ITVM 401 and associated secure gambling microprocessor chip 450, an instant ticket provider 440 that generates the EITs allocating prizes randomly or pseudorandomly among the EIT secure gambling microprocessor chips 450 distributed throughout the system, an optional management system 410 to monitor and control distribution and activation of the EITs in the field as well as ITVM performance, and a lottery (or gaming licensor) central site 430 that ultimately correlates and confirms the EITs dispensed to the public by the ITVMs.

In general, EITs are generated by an instant ticket provider 440 with inventory control and validation information loaded into the secure gambling microprocessor's 450 EEPROM 455 or alternatively ROM 453 at the time of manufacturer. As illustrated in FIG. 4, the instant ticket provider 440 can be a separate entity than the ITVM manufacturer, which would typically maintain the network management system 410. However, in an alternative embodiment, the instant ticket provider 440 and ITVM manufacturer and associated management system 410 can be the same entity—i.e., there is very little difference in the security models and costing between the two configurations.

Regardless of the association between the instant ticket provider 440 and ITVM manufacturer and associated management system 410, EITs are typically logistically grouped in packs or deals that are units of activation on legacy lottery or gambling operator instant ticket systems. Multiplicities of packs or deals are then grouped into pools primarily for the purpose of prize fund balancing. In a preferred embodiment, multiplicities of EIT packs or deals rather than virtual individual EITs are loaded onto the secure gambling microprocessor's 450 EEPROM 455 or ROM 453 at either the time of manufacturer or during customization by the instant ticket provider 440. The loaded EIT data consisting of inventory and validations codes 442 generated by the instant ticket provider 440. Alternatively, multiplicities of EIT packs or deals could theoretically be loaded via the network from the management system 410 onto the secure gambling microprocessor chip 450 when it is installed into the ITVM 401. However, this alternative embodiment may have the disadvantage of not being compatible with existing ITVM laws and regulations due to the transmitted nature of the EIT data.

Fortunately, EITs downloaded into the secure gambling microprocessor 300 at the instant ticket provider 440 or at the management system 410 can be speedily and economically loaded in large quantities via various off-the-shelf secure gambling microprocessor 300 data issuance systems or data programmers. For example, the Datacard CR500 instant issuance system is capable of automatically downloading EIT data to secure gambling microprocessors 300 embedded in ISO/CR-80 size plastic cards (i.e., typical credit card size) with either DC or contactless interfaces to ISO 14443 A/B, ISO 7816, or MIFARE® standards. Additionally, the Datacard CR500 is also capable of printing secure gambling microprocessor 300 cards with customized decorative overprints (including barcode 210—FIG. 2) thereby branding the cards with a distinctive lottery or gaming establishment themed artwork.

Each generated EIT inventory control and validation information 442 has a corresponding entry in the ship 445 and validation 444 files that identify any EIT's status (e.g., activated, stolen) in the ship file 445 and its winning or non-winning value in the validation file 444. As illustrated in FIG. 4, the ship 445 and validation 444 files are generated by the instant ticket provider 440 at the time of EIT generation where winning values are pseudorandomly assigned to inventory and validation codes. These ship 445 and validation 444 files are typically transmitted to the lottery central site 430 via the secure communications interfaces (443 and 433) between the two entities. Thus, the lottery central site 430 can track throughout the secure gambling microprocessor's 450 lifecycle EIT statuses. In an alternative embodiment, the ship 445 and validation 444 files may be transmitted to the ITVM management system 410 via separate secure communication interfaces 411 and 441. The transmission of the ship 445 and validation 444 files to the ITVM management system 410 may occur in addition to or instead of transmission of the same files to the lottery central site 430.

Regardless of the entity loading the EITs onto the secure gambling microprocessor 450, once the secure gambling microprocessor 450 is loaded with EITs it is eventually shipped to one of the ITVM retailer establishments where a technician or store employee notifies the management system 410 that the secure gambling microprocessor 450 was received, activates the microprocessor 450, and inserts it into the ITVM 401. There are multiplicities of methods to activate the secure gambling microprocessor 450 (e.g., scanning the barcode 210 on a card 207 housing an embedded secure gambling microprocessor—FIG. 2, initiating an activation sequence from the secure gambling microprocessor 450 once it is installed in the ITVM—FIG. 4). The significant point is that the activation process utilizes the network connection to the management system 410 and associated support module 413 and/or the lottery central site 430 (FIG. 4) to notify the system 410/430 that the microprocessor 450 was received in good working order and that the activation sequence employs a cryptographic protocol of sufficient complexity to deter any realistic form of emulation—e.g., digitally signed reply from the management system 410 in response to an Identify Friend or Foe ("IFF") challenge from the microprocessor 450. Since the secure gambling microprocessor 450 is activated on the network at the time of installation and non-activated secure gambling microprocessor's 450 will not dispense EITs, the microprocessor 450 can be shipped to the retailer or technician via common carrier with any stolen or missing secure gambling microprocessors 450 being flagged at the management system logistical tracking module 414.

Once the secure gambling microprocessor 450 is loaded and activated in the ITVM 401, EITs are dispensed individually as the consumer pays for and request another play. This dispensing of EITs can be sequential relative to the individual EIT location within the secure gambling microprocessor's 450 memory or, preferably, the sequence of dispensing can be determined by the secure gambling microprocessor's 450 RNG 454 offering an added level of security and unpredictability while still maintaining Class II ITVM regulations.

Preferably, individual EITs dispensed by the secure gambling microprocessor 450 should be digitally signed by the microprocessor 450 using a cryptographic protocol to ensure authenticity and auditability. One possible cryptographic protocol would be to append a Message Authentication Code (Mac) that is the ciphertext or hash result of encrypting the EIT cleartext with the microprocessor's 450 private key. Assuming the secure gambling microprocessor's 450 public key is known, the associated MAC could be decrypted by the ITVM 401 or management system 410 to verify authentication.

Installed secure gambling microprocessors 450 can in theory conduct normal EIT sales without the need for a network connection until the queue of preloaded EITs in the secure gambling microprocessor 450 is exhausted. However, for sales tracking, security monitoring, and other purposes it is preferable to maintain a network connection between the ITVM and the management system 410 such that cognizant personnel can review periodic reports and metrics 415.

In a preferred embodiment, management system 410 will also include a dedicated security component such as a Hardware Security Module 412 (HSM) that is responsible for cryptographic key storage and operations in support of secure communication between the management system 410 and the secure gambling microprocessors 450 and to secure the various management operations that are initiated within the management system 410 and carried out in the secure gambling microprocessor 450. In one specific embodiment, the secure channel communication between the secure gambling microprocessor 450 and the management system may be over a wired or wireless network. In another embodiment, the secure channel communication may be over a mobile network, or the like.

The security and integrity of the software operations in the microprocessor is maintained through cryptographic operations that take place within the tamper-resistant microprocessor 450. The security model for this invention relies on "end-to-end" security between the gambling management system 410 and secure gambling microprocessor 450 where the authenticity and integrity of all communication can be verified by either "end"—i.e., management system 410 or secure gambling microprocessor 450. The data channel can also be encrypted end-to-end if desired. This protection helps mitigate potential fraud involving the transmission of gambling management data to a secure gambling microprocessor 450 that was not created by the management system 410 and similarly protects against fraud involving the transmission of gaming data from a secure gambling microprocessor 450 to the management system 410 that did not originate from a secure gambling microprocessor 450. One embodiment, implements end-to-end communication security via cryptographic operations such as HSM 412, which provides a secure channel.

Figure 6:
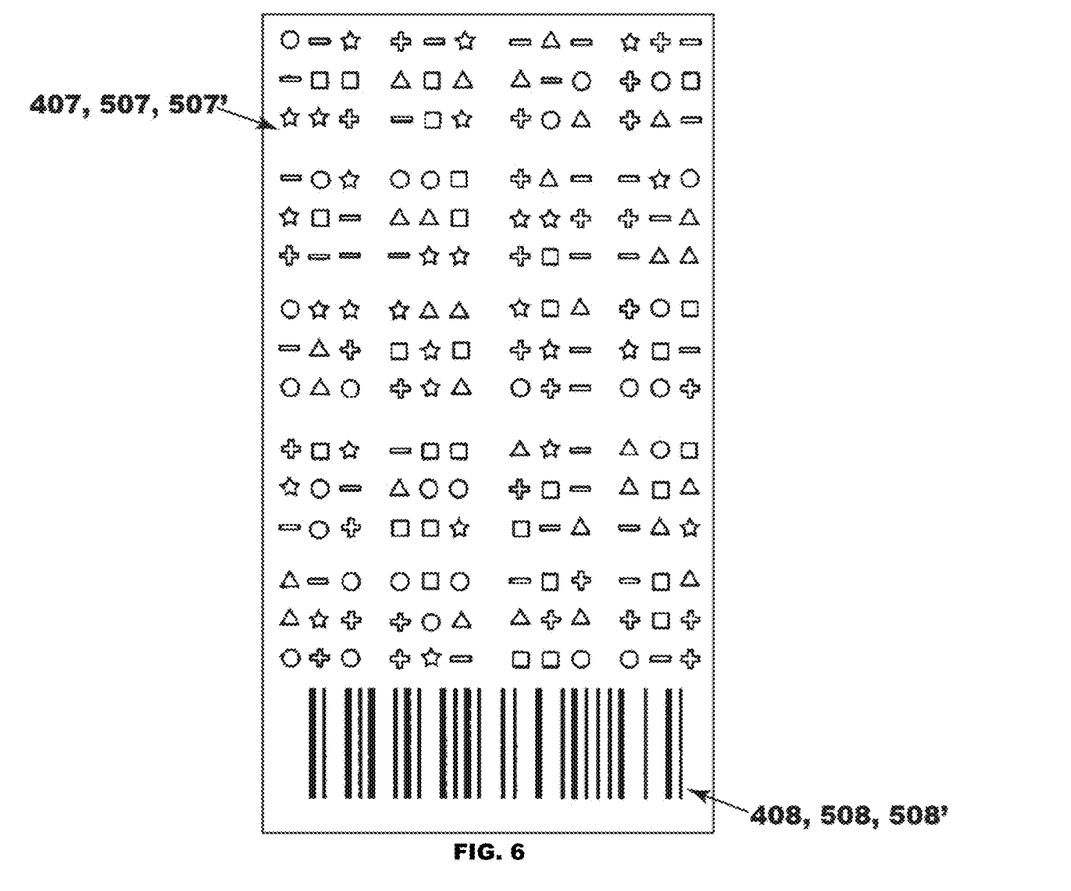
FIG. 6 is an enlarged view of the paper embodiments.

Optionally, paper embodiments 407 of EITs, providing a forensic record of play, may be dispensed by the ITVM 401 by printing the paper embodiments 407 in real time either after each play or, preferably, as a summary document whenever the player terminates a play session by cashing out. Ideally, these printed EIT paper embodiments 407, will also include some form of machine readable indicia 408 uniquely identifying the series of plays that were executed that could function as a bearer payable on demand document as well as assist the lottery or gaming authority in resolving any disputes. FIG. 6 shows an enlarged view of the paper embodiments 407, 507 and 507'.

Figure 5:
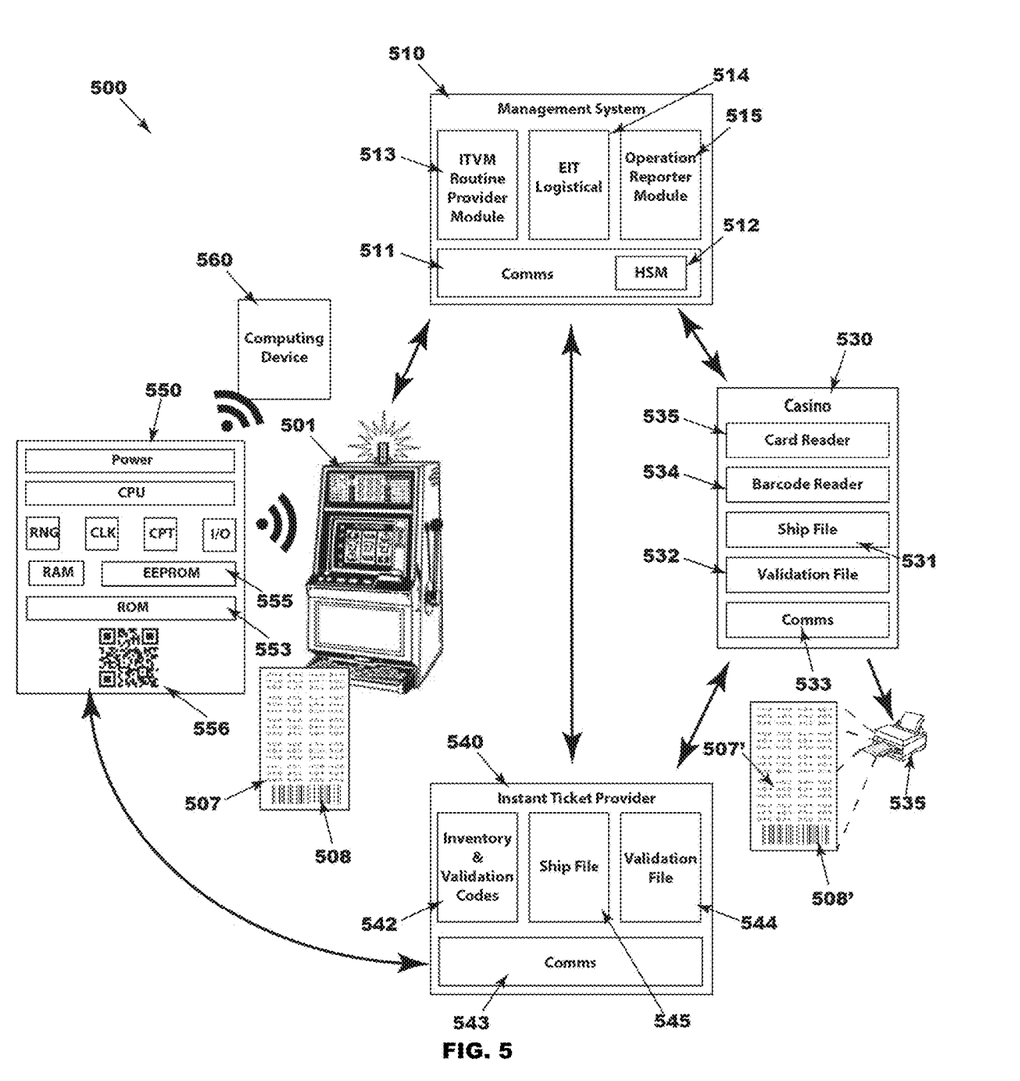
FIG. 5 is a block diagram providing a schematic graphical overview of a general embodiment as applied to integrating consumer accessible EITs into an overall system in accordance with an embodiment.

This is not to infer that overall system 400 is only compatible with secure gambling microprocessors housed within ITVM locked cabinets. FIG. 5 illustrates an alternative system embodiment 500, of an ITVM 501 that receives individual EITs transmitted during play from a secure gambling microprocessor 550 that is in the possession of the consumer. In this embodiment, portions of the EITs loaded into the consumer held secure gambling microprocessor 550 are typically unlocked at different times whenever the consumer pays to wager at a lottery or gaming operator facility 530. With this embodiment when the consumer pays for wagers at a gaming operator retail location 530, the gaming operator unlocks a portion of the EITs already stored in the secure gambling microprocessor's memory (EEPROM 555 or ROM 553) with a card reader 535 via a DC or RF (e.g., Near Field Communications or "NFC") communications interface.

There are multiplicities of methods to unlock portions of EITs stored in the secure gambling microprocessor 550 (e.g., scanning 534 the barcode 556 on the card housing the embedded secure gambling microprocessor 550 and then unlocking a portion of EITs utilizing the DC or RF communications interface via a separate card reader 535 local to the gaming establishment 530). Of course, as previously discussed, the unlocking sequence should employ a cryptographic protocol of sufficient complexity to deter any realistic form of emulation—e.g., IFF challenge from the secure gambling microprocessor 550. Since portions of the secure gambling microprocessor 550 stored EITs are unlocked, the remaining locked portions of EITs will remain inaccessible.

As shown in FIG. 5, system 500 embodiment includes: the ITVM 501, the consumer held secure microprocessor and associated packaging 550, an instant ticket provider 540 that generates the EITs allocating prizes randomly or pseudorandomly among the EIT secure gambling microprocessor chips 550 sold to consumers, an optional management system 510 to monitor game play of the EITs in the field as well as ITVM performance, and a lottery or gaming establishment 530 that sells and unlocks the EITs to consumers as well as pays any prizes won.

As before, EITs are generated by an instant ticket provider 540 with inventory control and validation information loaded into the secure gambling microprocessor's 550 EEPROM 555 or alternatively ROM 553 at the time of manufacturer. The instant ticket provider 540 can be a separate entity than the ITVM manufacturer, which would typically maintain the network management system 510—of course, other arrangements are possible (e.g., instant ticket provider and ITVM manufacturer are the same entities).

Regardless of the association between the instant ticket provider 540 and ITVM manufacturer and associated management system 510, EITs are typically logistically grouped in packs or deals that are units of activation on legacy lottery instant ticket systems. The loaded EIT data consisting of inventory and validations codes 542 generated by the instant ticket provider 540.

Again, EITs downloaded into the secure gambling microprocessor 550 at the instant ticket provider 540 or at the management system 510 can be speedily and economically loaded in large quantities via various off-the-shelf secure gambling microprocessor 550 data issuance systems or data programmers.

Each generated EIT inventory control and validation information 542 has a corresponding entry in the ship 545 and validation 544 files that identify any EIT's status (e.g., activated, stolen) in the ship file 545 and its winning or non-winning value in the validation file 544. The ship 545 and validation 544 files are generated by the instant ticket provider 540 at the time of EIT generation where winning values are pseudorandomly assigned to inventory and validation codes. These ship 545 and validation 544 files are typically transmitted to the gaming establishment 530 via the secure communications interfaces (543 and 533) between the two entities. Thus, the gaming establishment 530 can track throughout the secure gambling microprocessor's 550 lifecycle EIT statuses. In an alternative embodiment, the ship 545 and validation 544 files may be transmitted to the ITVM management system 510 via separate secure communication interfaces 511 and 541. The transmission of the ship 545 and validation 544 files to the ITVM management system 510 may occur in addition to or instead of transmission of the same files to the gaming establishment 530. Regardless of the entity loading the EITs onto the secure gambling microprocessor 550, once the secure gambling microprocessor 550 is loaded with EITs it is eventually shipped to gaming establishment 530 where a store employee notifies the management system 510 that the secure gambling microprocessor 550 was received Once the secure gambling microprocessor 450 is received at the gaming establishment 530, it is placed on sale where portions of the loaded EITs can be unlocked at the time of sale. The consumer would then load the secure microprocessor 550 individual unlocked EITs into an ITVM 501, via a consumer accessible card reader, or alternatively to a consumer owned computing device 560 (e.g., smart phone) and play the predetermined games.

Preferably, individual EITs transmitted by the secure gambling microprocessor 550 should be digitally signed by the secure gambling microprocessor 550 using a cryptographic protocol to ensure authenticity and auditability. One possible cryptographic protocol would be to append a Mac that is the ciphertext or hash result of encrypting the EIT cleartext with the microprocessor's 550 private key. Assuming the secure gambling microprocessor's 550 public key is known (e.g., the public key could be embedded in the secure gambling microprocessor's 550 barcode 556, the associated MAC could be decrypted by the ITVM 501, consumer owned computing device 560, or management system 510 to verify authentication.

In a preferred embodiment, management system 510 will also include a dedicated security component such as a HSM 512 that is responsible for cryptographic key storage and operations in support of secure communication between the management system 510 and the secure gambling microprocessors 450 and to secure the various management operations that are initiated within the management system 410 and carried out in the secure gambling microprocessor 550.

The security and integrity of the software operations in the secure gambling microprocessor 550 is maintained through cryptographic operations that take place within the tamper-resistant microprocessor 550. The security model for this invention relies on "end-to-end" security between the gambling management system 510 and secure gambling microprocessor 550 where the authenticity and integrity of all communication can be verified by either "end"—i.e., management system 510 or secure gambling microprocessor 550. Thus, the ITVM 501 would typically function as a relay between the management system 510 and secure gambling microprocessor 550. Preferably, the data channel can also be encrypted end-to-end. This protection helps mitigate potential fraud involving the transmission of gambling management data to a secure gambling microprocessor 550 that was not created by the management system 510 and similarly protects against fraud involving the transmission of gaming data from a secure gambling microprocessor 550 to the management system 510 that did not originate from a secure gambling microprocessor 550. One embodiment, implements end-to-end communication security via cryptographic operations such as HSM 412, which provides a secure channel.

Optionally, paper embodiments 507 and 507' of EITs having corresponding machine readable indicia 508 and 508', provide a forensic record of play. With the ITVM 501, printing the paper embodiments 507 in real time either after each play or, preferably, as a summary document whenever the player terminates a play session by cashing out. Alternatively, consumer owned computing devices 560 could produce the same forensic record of play 507' by scanning 534 the barcode 556 of the secure microprocessor 550 or reading the data directly 535 from the secure gambling microprocessor 550. Ideally, these printed EIT paper embodiments 407 and 407', will also include some form of machine readable indicia 408 and 408' uniquely identifying the series of plays that were executed that could function as a bearer payable on demand document as well as assist the lottery or gaming authority in resolving any disputes.

It should be appreciated by those skilled in the art that various modifications and variations may be made to the present invention without departing from the scope and spirit of the invention. It is intended that the present invention include such modifications and variations as come within the scope of the appended claims.

What is claimed is:

1. A method for electronically delivering a plurality of Electronic Instant Tickets (EITs) from a gaming service provider, via gaming microprocessors, to a plurality of Instant Ticket Vending Machines (ITVMs), each gaming microprocessor including (i) memory, and (ii) a communications interface, each ITVM including (i) a communications interface, (ii) a display, (iii) a memory, and (iv) application software that displays results of a game of chance, the method comprising:
   (a) the game service provider electronically programming the gaming microprocessor with a set of predetermined EITs that are stored in the memory of the gaming microprocessor, wherein the set of EITs determines the value of all prizes that are delivered via the ITVM;
   (b) electronically enabling a set or subset of EITs embodied in the gaming microprocessor, such that a portion of the EITs can be dispensed to the ITVM on demand;
   (c) transmitting an EIT from the memory of the gaming microprocessor to the memory of an ITVM via the respective communications interfaces of the gaming microprocessor and the ITVM, wherein the transmitted EIT allows the ITVM to operate independently of network communications with the game service provider and without providing predetermined outcomes embodied in a paper medium;
   (d) automatically initiating a gaming session on the ITVM using the application software in the ITVM upon detection by the communications interface of the ITVM that an EIT has been transmitted to the memory of the ITVM, wherein communications for the gaming session occurs using the communications interface of the gaming microprocessor;
   (e) displaying the gaming session on the display of a ITVM, wherein the gaming session uses the received predetermined EIT to generate a result for the game of chance, the result determining any winnings for the game of chance; and
   (f) the ITVM dispensing printed paper embodiments of the EITs associated with the gaming session and which are displayed on the display during the gaming session, wherein the dispensed printed paper embodiments of the EITs did not exist prior to the gaming session, and thus are only printed upon game play of an EIT.

2. The method of claim 1 further comprising:
   (g) generating by the gaming microprocessor a Message Authentication Code (Mac) that includes an encrypted or hash value of each EIT dispensed and associating the generated Mac for subsequent use in verifying the authenticity of the EIT.

3. The method of claim 2 wherein the gaming microprocessor has a private key, and wherein the Mac generated is the ciphertext of the transmitted EIT encrypted with the gaming microprocessor's private key.

4. The method of claim 1 wherein the communications interfaces provide a Direct Contact (DC) interface.

5. The method of claim 1 wherein the ITVM dispensed printed paper embodiments of EITs are dispensed after each play.

6. The method of claim 1 wherein the ITVM dispensed printed paper embodiments of EITs are dispensed one time at the end of a gaming session.

7. The method of claim 1 wherein the gaming microprocessor is housed in a cabinet of the ITVM in advance of the gaming session.

8. The method of claim 1 wherein the gaming microprocessor is in the possession of the player and presented to the ITVM at the time of play.

9. The method of claim 1 wherein the communications interfaces are contactless Near Field Communication (NFC) interfaces.

10. The method of claim 1 wherein the EITs are transmitted sequentially relative to individual EIT locations within the memory of the gaming microprocessor.

11. The method of claim 1 wherein the gaming microprocessor further includes a Random Number Generator (RNG), and the EITs are transmitted randomly from individual EIT locations within the memory of the gaming processor based on an outcome of the RNG.

12. A system for electronically dispensing a plurality of Electronic Instant Tickets (EITs) comprising:
   (a) a gaming microprocessor including a memory and a communications interface, the memory being electronically programmed by a game service provider with a set of predetermined EITs that are stored therein, wherein the set of EITs determines the value of all prizes that are delivered from use of the gaming microprocessor; and
   (b) an Instant Ticket Vending Machine (ITVM) including a communications interface, a display, a memory, and application software that displays results of a game of chance,
   wherein the gaming microprocessor is configured to transmit EITs in the set of EITs from the memory of the gaming microprocessor to the memory of an ITVM via the respective communications interfaces of the gaming microprocessor and the ITVM, wherein the transmitted EITs allow the ITVM to operate independently of network communications with the game service provider and without providing predetermined outcomes embodied in a paper medium,
   wherein the ITVM is configured to:
      (i) receive the transmitted EITs,
      (ii) automatically initiate a gaming session on the ITVM using the application software in the ITVM upon detection by the communications interface of the ITVM that an EIT has been transmitted to the memory of the ITVM, and wherein communications for the gaming session occurs using the communications interface of the gaming microprocessor,
      (iii) display the gaming session on the display of a ITVM, wherein the gaming session uses the received predetermined EIT to generate a result for the game of chance, the result determining any winnings for the game of chance, and
      (iv) dispense printed paper embodiments of the EITs associated with the gaming session and which are displayed on the display during the gaming session, wherein the dispensed printed paper embodiments of the EITs did not exist prior to the gaming session, and thus are only printed upon game play of an EIT.

13. The system of claim 12 wherein the gaming microprocessor is further configured to generate a Message Authentication Code (Mac) that includes an encrypted or hash value of each EIT dispensed and associate the generated Mac for subsequent use in verifying the authenticity of the EIT.

14. The system of claim 13 wherein the gaming microprocessor has a private key, and wherein the Mac generated is the ciphertext of the transmitted EIT encrypted with the gaming microprocessor's private key.

15. The system of claim 12 wherein the communications interfaces provide a Direct Contact (DC) interface.

16. The system of claim 12 wherein the ITVM dispensed printed paper embodiments of EITs are dispensed after each play.

17. The system of claim 12 wherein the ITVM dispensed printed paper embodiments of EITs are dispensed one time at the end of a gaming session.

18. The system of claim 12 wherein the ITVM further includes a cabinet, and the gaming microprocessor is housed in the cabinet of the ITVM in advance of the gaming session.

19. The system of claim 12 wherein the gaming microprocessor is in the possession of the player and presented to the ITVM at the time of play.

20. The system of claim 12 wherein the communications interfaces are contactless Near Field Communication (NFC) interfaces.

21. The system of claim 12 wherein the EITs are transmitted sequentially relative to individual EIT locations within the memory of the gaming microprocessor.

22. The system of claim 12 wherein the gaming microprocessor further includes a Random Number Generator (RNG), and the EITs are transmitted randomly from individual EIT locations within the memory of the gaming processor based on an outcome of the RNG.

\* \* \* \* \*